United States Patent [19]

Reimann

[11] Patent Number: 5,052,237

[45] Date of Patent: Oct. 1, 1991

[54] TRANSMISSION DEVICE

[75] Inventor: Jean Reimann, Puplinge, Switzerland

[73] Assignee: Aluweld S.A., Geneva, Switzerland

[21] Appl. No.: 520,454

[22] Filed: May 8, 1990

[30] Foreign Application Priority Data

May 17, 1989 [CH] Switzerland .......................... 1837/89
May 17, 1989 [CH] Switzerland .......................... 1838/89

[51] Int. Cl.⁵ .......................... B60K 20/02; B62B 5/02
[52] U.S. Cl. ...................................... 74/335; 180/8.2;
180/907; 280/5.26; 280/DIG. 10
[58] Field of Search .................. 74/335, 342, 343, 344,
74/345; 280/5.2, 5.26, DIG. 10; 180/8.2, 907

[56] References Cited

U.S. PATENT DOCUMENTS

| 849,270 | 4/1907 | Schafer et al. ...................... 280/5.26 |
| 2,742,973 | 4/1956 | Johannesen ............ 280/DIG. 10 X |
| 3,515,401 | 6/1970 | Gross ................................... 280/5.26 |
| 4,264,082 | 4/1981 | Fouchey, Jr. ...................... 280/5.26 |
| 4,709,772 | 12/1987 | Brunet .................................. 180/8.2 |

FOREIGN PATENT DOCUMENTS

| 59-73372 | 4/1984 | Japan .................................. 280/5.26 |
| 1213930 | 11/1970 | United Kingdom ............... 280/5.26 |
| 8605752 | 10/1986 | World Int. Prop. O. ......... 280/5.26 |

Primary Examiner—Dwight Diehl
Attorney, Agent, or Firm—Young & Thompson

[57] ABSTRACT

The invention relates to a transmission device for the motorization of a rolling-chair for example. Said transmission device comprises a hollow shaft 7 provided at each of its ends with a rolling train 8-13 idly pivoted on the hollow shaft 7 and comprising a toothed crowns 21. It comprises two control shafts 14 slidingly mounted within the hollow shaft 7 merging each out of one end of it. Each control shaft 14 is connected to a pinion intended to cooperate with the corresponding toothed crown 21. It comprises a control device 23 of the axial position of said control shaft 14 with respect to the hollow shaft 7.

13 Claims, 3 Drawing Sheets

TRANSMISSION DEVICE

The present invention relates to transmission devices for the motorization of transport means such as carriages, trucks, rolling chairs or armChairs, and more particularly for the motorization of such means which comprise rolling trains formed by flanges provided at least with two wheels permitting to ride over steps or even going up and down staircases.

The present invention aims the motorization of a transport means such as cited hereabove which is simple, light, reliable and of low encumbrance.

The present invention has for its object a transmission device for the motorization of transport means, particularly carriages, trucks or running armchairs, characterized by the fact that it comprises a hollow driving shaft provided at each of its ends with a rolling train idly pivoted on said hollow shaft and comprising a toothed crown; by the fact that it comprises two controlled shafts slidingly mounted within the hollow shaft merging each out of one end of it; and by the fact that each control shaft is connected to a pinion intended to cooperate with the corresponding toothed crown of a rolling train; and by the fact that it comprises a control device of the actual position of said control shaft with respect to the hollow shaft.

The attached drawing shows schematically and by way of example one embodiment of the transmission device according to the invention.

In the example shown the device is mounted, for the purpose of this descriptiOn only, to the motorization of a luggage truck or trolley.

Figure 1:
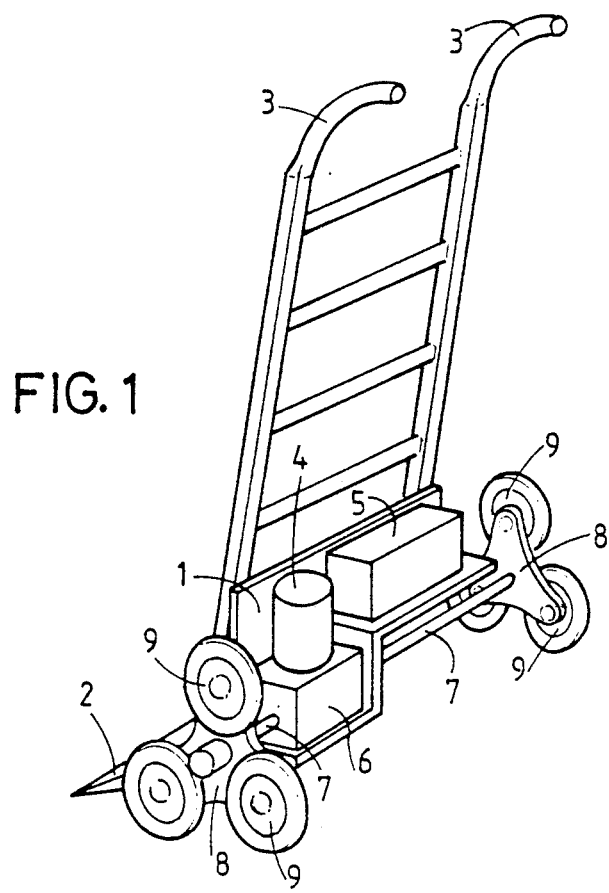
FIG. 1 shows a truck provided with the transmission device according to the invention.
Figure 2:
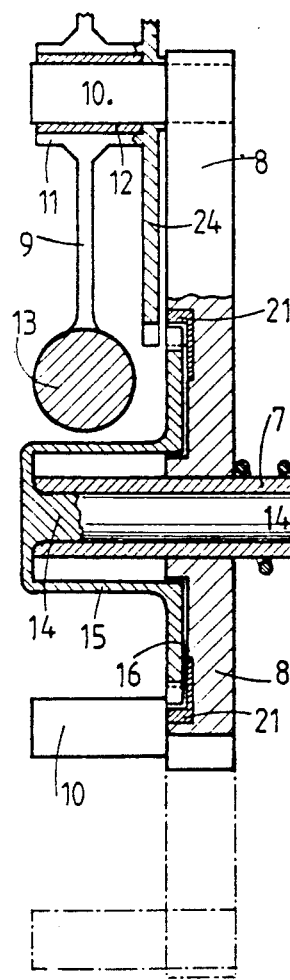
FIG. 2 shows at greatest scale, partially in crosssection, the transmission device.
Figure 3:
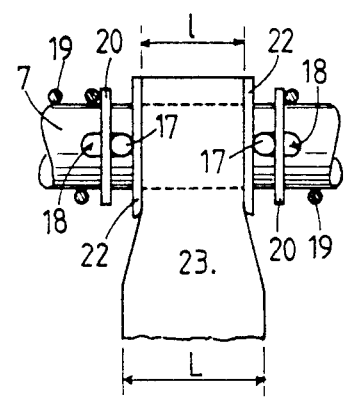
FIG. 3 shows a detail of the transmission device along arrow A of FIG. 2. p

FIG. 1 shows a trolley comprising a support 1 being part of its structure, a charging plate 2 and grips or handles 3.

The propulsion or motorization assembly of this trolley comprises an eleCtrical motor 4 controlled by a servo-amplifier (not shown) and fed by batteries 5. This motor is fastened with an endless screw and planetary transmission box 6 meshing directly with the motor 4. The motor 4, the batteries 5 and the transmission box 6 are mounted on the support of the trolley. The output shaft of the transmission box 6 or driving shaft 7 is hollow, extends through the transmission box and is provided at each of its ends with a rolling train.

In the example shown each rolling train comprises a flange 8 pivoted through a bearing or a ball bearing (not shown) on the outside surface of the hollow shaft 7 in the vicinity of its ends. This flange 8 comprises at least one, three in the example shown, wheels 9 idly pivoted on shaft 10 fastened with the flange 8. To this effect the hub of these wheels 9 is pivoted on a shaft 10 through the intermediary of a bearing 12. Each wheel 9 comprises a rolling tire 13.

The transmission device itself comprises two transmission shafts 14 slidingly mounted within the driving shaft 7 and the ends of which merging out of this driving shaft are fastened with a skirt 15 surrounding the terminal portion of the shaft 7 and carrying a toothed pinion 16.

Each internal end, practically located one against the other of the transmission shaft 14 is provided with a pin 17 going through the motor shaft 7 through slots 18. A return spring 19 is located between each flange 8 and a ring 20 resting on the corresponding pin 17 and tends to displace the internal ends of this transmission shaft 14 towards one another, that means to apply the pinion 16 against the external face of the flanges 8. In this position the pinions 16 are meshing with the internal toothing of the toothed crowns 21 fastened on the outside face of these flanges 8. Therefore, when the motor is actuated, the driving shaft 7 drives the transmission axis 14 in rotation through the intermediary of the pins 17 so that the flanges 8 are driven in rotation through these transmission shafts 14, the skirts 15 and the pinions 16 meshing with the toothed crowns 21 of the flanges 8. The wheels 9 are pivoted freely on the shaft 10 of the flange.

In this realization, the rolling trains of the trolley are driven so that as to be able to go up a step or go up and down staircases.

The transmission device comprises further a control fork 23 sliding around the motor shaft 7, between two rings 22 resting against the pins 17. This control fork 23 comprises a narrow part 1 the width of which corresponds to the space between the rings 22 when the pinions 16 mesh with the corresponding toothed crowns 28 followed by a slope connecting this narrow part to a wide part L. Through a linear displacement of the fork, perpendicular with respect to the motor shaft 7, introducing the wide portion L between the rings 22 the transmission axes 14 are spread apart by means of the pins 17 against the action of the springs 19 and the pinions 16 are disengaged from the corresponding toothed crowns 21. As from that moment the flanges 8 are idly pivoted on the motor shaft 7.

Simultaneously, this axial displacement of the control shaft causes the meshing of the pinions 16 with the toothed wheels 24 a to the hub of each wheels 9. So a rotation of the transmission axes 14 causes a driving rotation of all the wheels 9 of each flange. In a variant only one of the wheels 9 for each flange could comprise a toothed wheel 24 and only this wheel would be driven in rotation.

In this realization of the transmission device, the trolley is driven by the rotation of at least one wheel 9 for each flange 8 for its displacements on flat surfaces.

Of course according to the length of the axial stroke of the transmission shafts 14 to pass from the meshing of the pinions 16 with the toothed crowns 21 to their meshing with the toothed wheels 24 one can provide an intermediary position for which the pinions 16 are meshing neither with the toothed crowns 21 nor with the wheels 24. In this intermediary position, which would correspond to a portion of intermediate width of the control fork 23, the trolley is not driven, it can be freely manually displaced.

To have the trolley stand still however, one places the transmission device in one or the other of its active positions and the motor is stopped. The inertia of the transmission enables an efficient braking so that the trolley can be stopped in this manner even on relatively strong slopes.

The actuation of the fork 23 in its linear displacements can be done either manually or by the intermediary of a hydraulic, pneumatic or electrical system.

It is evident that this transmission device can be applied to other transport means for example to rolling chairs or to bigger trucks in which case the motor could not be an electrical one, but an internal combustion engine for example coupled to a gear-box the outside shaft of which would go through outside the gear-box and would be hollow.

In a variant one can also provide rolling trains which are each formed by only one wheel concentric to the flange 8. In this case when the pinions 16 are meshing with the toothed crowns 21 the device is driven whereas when the control shafts 14 are displaced through the action of the fork 23, the pinions 16 are out of engagement with the corresponding crowns 21 and the device is rolling idly. In such an execution the flange 8 can be replaced by a hub carrying the toothed crown and spokes connecting this hub to the rim to the unique wheel.

In a variant, one can provide hollow control shaft and one can incorporate therein control rods, actuated by a second fork, similar to the fork 23, acting on brakes cooperating with the tires 13 of the wheels 9.

Figure 4:
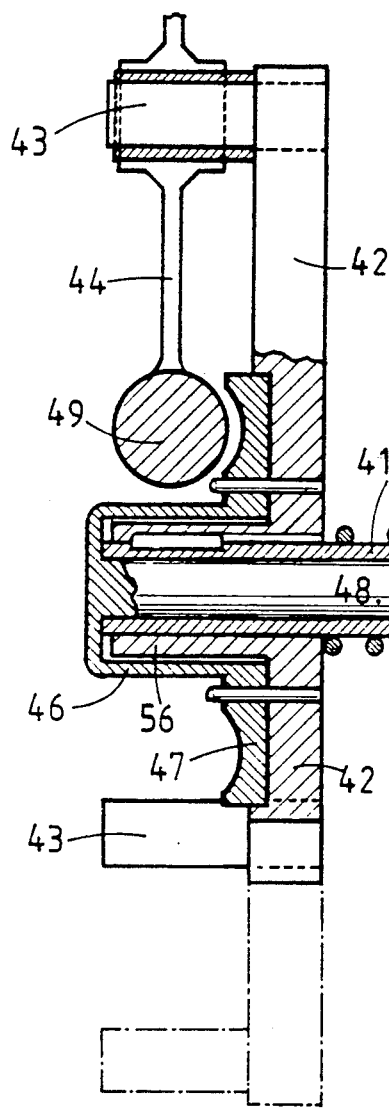
FIG. 4 shows a partial schematical cross-section of a braking device applied to a fix shaft.
Figure 4:
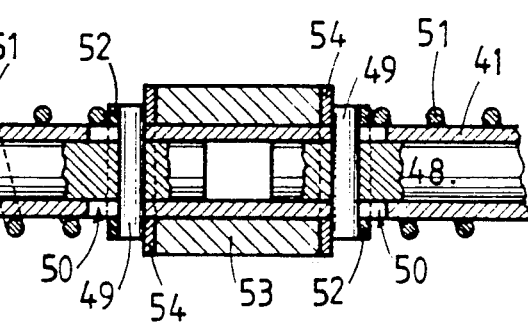
Figure 5:
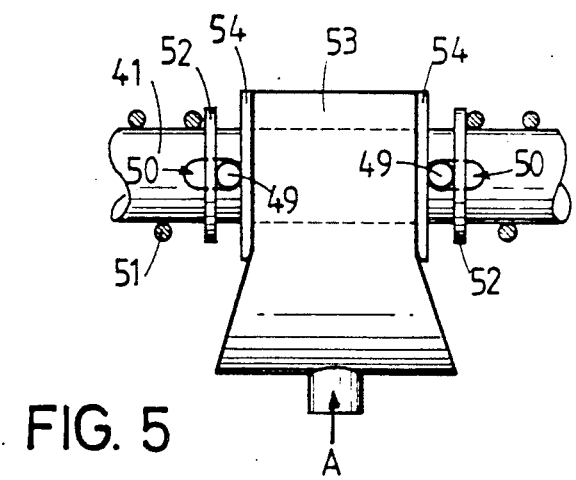
FIG. 5 and 6 show details of the device shown at FIG. 4.
Figure 6:
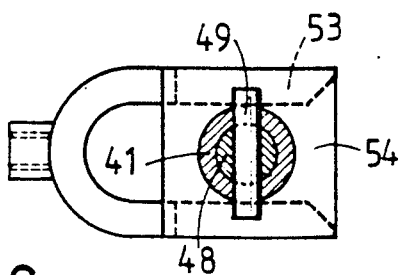

The first embodiment of the braking device shown at FIGS. 4 to 6 is applicable to any transport means or handling equipment which is not motorized and which comprises at least one fix shaft 41 at the end of which are pivoted rolling trains constituted in the example shown by a flange 42 pivoted on the shaft 41 and provided with several shafts 43 separated the one from the other and used as pivots for wheels 44.

The shaft 41 is hollow and within this shaft are slidingly mounted two control axes 48 the ends of which are separated the one from the other and are connected to a braking pad 47 through a skirt 46 surrounding the ends of the hollow shaft 41. This pad 47 is guided in its axial displacements by means of guides fixed in the flange 42 and going through corresponding holes of the pad 47.

This braking pad 47 is intended to act on the tires 49 of the wheels 44 pivoted on the flange 42 in order to have them stand still with respect to the flange 42.

The ends of the control shafts 48 which are near one another are crossed by pins 49 which cross also the walls of the hollow shaft 41 through slots 50. Returns springs 51 are located between each flange 42 and a ring 52 resting against the corresponding pin 49. These springs 51 tend to displace the control shafts 48 the one towards the other.

To actuate the braking pads 47 it suffices to spread out the control shafts 48. This is done in the example shown by means of a control fork 53 disposed between the pins 49 and bearing against them through the intermediary of rings 54. This control fork 53 comprises a portion 55 the width of which increases so that when one makes a push against the fork in the direction of the arrow A one causes the spreading apart of the pins 49 and thus of the control shafts 48 which apply the braking pads 47 against the tires 49 of the wheels.

When the transport device, say the trolley or the rolling chair, is displaced on a flat surface, it rolls on two wheels 49 the flange standing still. When the braking pads 47 are actuated the device is stopped, the wheels 49 being blocked with respect to the flange 42.

With such rolling trains it is possible to go up and down steps or staircases.

If the shaft 41 is mounted on the device through the intermediary of bearings (not shown) then the control shafts 48 can be keyed onto a hub 56 of the flange through one or several keys.

The control fork 53, 55 can be actuated manually or by means of a hydraulic, pneumatic or electrical system if necessary.

In a variant the rolling train can comprise only one wheel of great diameter pivoted on the skirt 46. In this case the flange 42 presents a reduced diameter and the braking pads 47 act on a disc or hub of the unique wheel.

Figure 7:
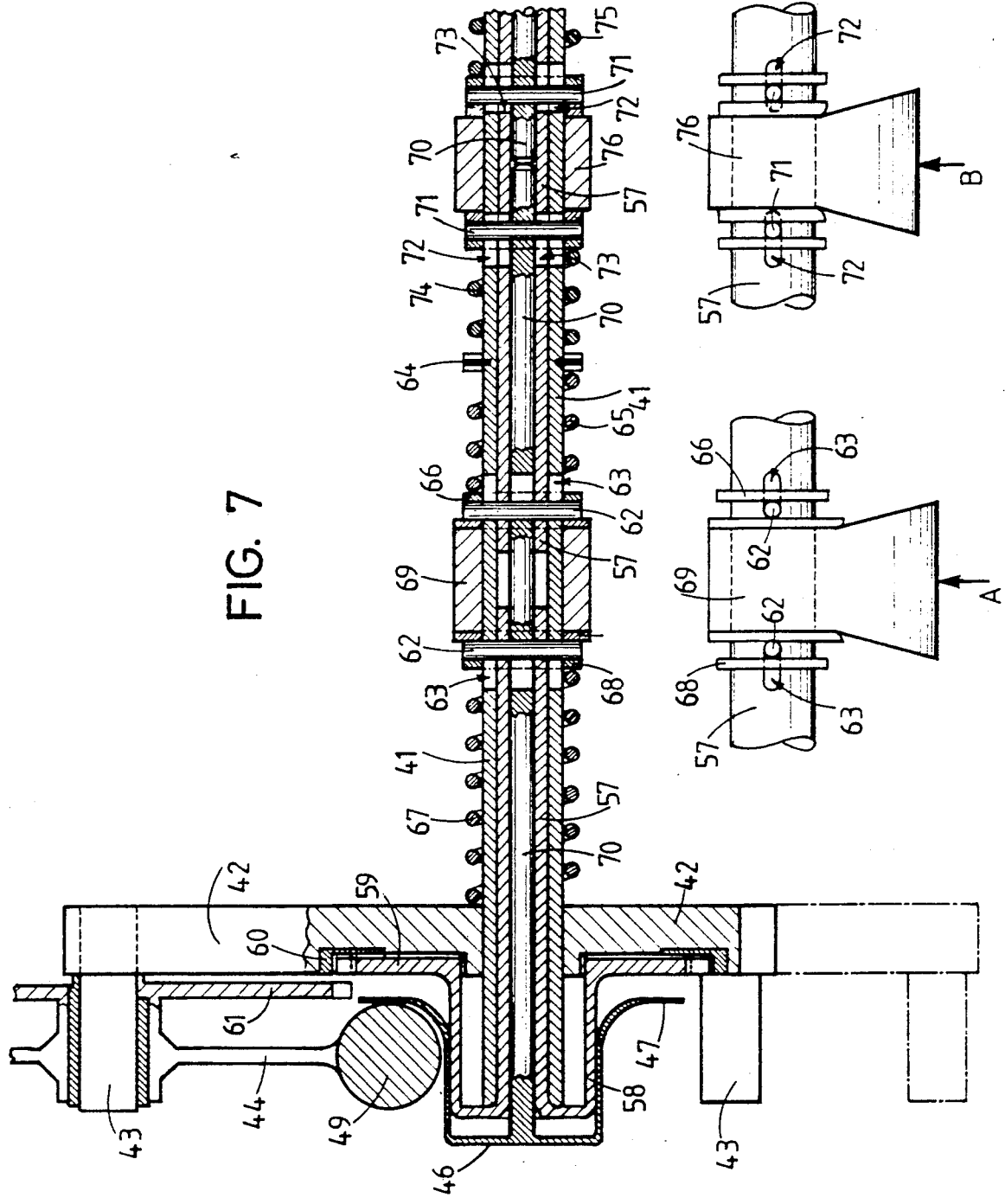
FIG. 7 shows in cross-section a variant of the braking device applied to a driving shaft.

The second embodiment of the braking device shown at FIG. 7 is applied to a motorized device. This device is always provided with a hollow shaft 41 on the end of which are pivoted flanges 42 carrying wheels 44.

In this embodiment this shaft 41 is a driving shaft, that is that it can be driven into rotation through a motor and a gear box. Within this hollow driving shaft are slidingly mounted two transmission shafts 57 the aligned ends of which carry a skirt 58 carrying itself a pinion 59 meshing either with the internal toothing of a toothed crown 60 carried by the flange 42, or with the toothed wheels 61 carried by the hub of the wheels 44, according to the axial position of the transmission axis 57.

The close ends of the two hollow transmission shafts 57 are provided with pins 62 going through the shaft 41 through slots 63.

The hollow shaft 41 comprises a stop ring 64 acting as an abutment for a return spring 65 the other end of which rests against a ring 66 and the pin 62. A second return spring 67 is located between the flange 42 and a ring 68 resting against the other pin 62. These springs 65,67 tend to displace the one towards the other the hollow transmission shafts and to cause the meshing of the pinion 59 with its toothed crowns 60 in order to drive the flanges 42 in rotation.

A control fork 69 enables by means of a linear displacement in the direction of the arrow A to spread apart the pins 62 and to separate the pinions 59 from the crowns 60. These pinions 59 mesh then with the toothed wheels 61 for the driving in rotation of the wheels 44.

Control rods 70 are slidingly mounted within the transmission shafts 57 and carry at their outside ends a skirt 46 provided with a braking pad 47 intended to cooperate with the tire 49 of the wheels 44. The close ends of these control rods 70 are provided with pins 71 going through a transmission shaft 57 and through the shaft 41 by means of the slots 62,63.

Return springs 74,75 are located between the stop ring 64 and one of the pins 71 respectively between the flange 42 and the other pins 71 and tend to displace the one towards the other the control rods maintaining the braking pads 47 out of engagement with the tires 49 of the wheels 44.

A fork 76 displacable along a direction of the arrow B enables to spread apart the pins 71 and to apply by this movement the braking pads 47 against the tires 49 of the wheels 44 and to lock them.

It is to be seen that this braking device can also be applied to a motorized device the hollow shaft 41 of which is revolving. Particularly this braking device can be mounted on rolling-chairs and other transport means.

What is claimed is:

1. Transmission device for the motorization of transport means, characterized by the fact that it comprises a hollow driving shaft provided at each of its ends with a rolling train idly pivoted on said hollow shaft and comprising a toothed crown; by the fact that it comprises two control shafts slidingly mounted into the hollow shaft merging each out of one end of it; by the fact that each control shaft is connected to a pinion intended to cooperate with the corresponding toothed crown of a rolling train; and by the fact that it comprises a control device of the axial position of said control shaft with respect to the hollow shaft.

2. Transmission device according to claim 1, characterized by the fact that each control shaft is provided with a pin passing through the hollow driving shaft through two longitudinal opposed slots; springs bearing against the rolling trains and against these pins tending to displace towards one another the two control shafts; and by the fact that it comprises an actuating fork controlling through its linear displacement the distance separating the two pins and thus the control shafts and the pinions which they carry.

3. Transmission device according to claim 2, characterized by the fact that each rolling train comprises a flange carrying the toothed crown, this flange comprising at least two wheels idly pivoted on shafts fastened with this flange; by the fact that the hub of at least one of said wheels of each flange is fastened with a toothed wheel meshing with the pinions carried by the control shafts when said latter are in spread out position.

4. Device according to claim 3, characterized by the fact that several wheels pivoted on a same flange comprise toothed wheels meshing simultaneously with the pinion fastened with the corresponding control shaft.

5. Transmission device according to claim 1, characterized by the fact that the control shafts are hollow, that in each of them is slidingly mounted a control rod the end of which merging out of the corresponding control shaft is fastened with a brake acting on the rolling train, these control rods being actuated by a control member.

6. Transmission device according to claim 1, characterized by the fact the rolling trains comprise only one wheel fastened with the hub, this hub being provided with said toothed crown cooperating with the pinion of the corresponding control shaft.

7. Braking device for transport and handling means comprising at least two rolling trains mounted each at the end of a hollow shaft, characterized by the fact that it comprises control rods slidingly mounted into the hollow shaft merging out of it at each of its ends; by the fact that the outside ends of these rods are connected each to a braking pad intended to cooperate with one member of the corresponding rolling train; by the fact that the ends of the control rods which are near one another comprise each a member crossing the hollow shaft through a corresponding slot; by the fact resilient actions tend to displace the control rods the one towards the other; and by the fact that a control member rests on the said members to cause the spreading of said control rods and thus the braking.

8. Device according to claim 7, characterized by the fact that each rolling train comprises a wheel provided with a hub with which the braking pad cooperates.

9. Device according to claim 7, characterized by the fact that each rolling train comprises a flange pivoted on the end of the hollow shaft, this flange being provided with at least one excentered wheel idly pivoted on a shaft fastened with this flange, and by the fact that the braking pad acts on the tire of the wheel.

10. Device according to claim 9, characterized by the fact that each flange comprises several wheels, the braking pad acting on the tires of all the wheels simultaneously.

11. Device according to claim 9, characterized by the fact that each transmission shaft is fastened with a pinion intended to mesh either with an inside toothed crown carried by the flange or with toothed wheels fastened with the wheels pivoted on the flange depending the axial position of these transmission axes.

12. Device according to claim 7, characterized by the fact that the control rods are located within the hollow transmission shafts themselves slidingly mounted within the hollow shaft.

13. Device according to claim 7, characterized by the fact that the control member is constituted by a fork acting on the said members formed by the pins, this fork being linearly displacable under the action of an actuating manual member either directly or indirectly.

* * * * *